United States Patent [19]

Altwein

[11] 4,090,244
[45] May 16, 1978

[54] METHOD AND CIRCUIT ARRANGEMENT FOR DETERMINING THE VECTOR COMPONENTS OF AN OSCILLATION

[75] Inventor: Michael Altwein, Darmstadt, Germany

[73] Assignee: Firma Carl Schenck AG, Darmstadt, Germany

[21] Appl. No.: 774,643

[22] Filed: Mar. 4, 1977

[30] Foreign Application Priority Data

Mar. 23, 1976 Germany .............................. 2612238

[51] Int. Cl.² .......................... G06J 1/00; G06G 7/22; G01M 1/22
[52] U.S. Cl. ..................................... 364/603; 73/579; 364/463; 364/508; 73/462
[58] Field of Search ............. 235/151.3, 151.31, 150.5, 235/150.52, 150.53, 186, 189; 73/65, 66, 67, 67.2, 71.4, 146, 462

[56] References Cited

U.S. PATENT DOCUMENTS

| 3,558,863 | 1/1971 | Williams, Jr. et al. | 235/150.52 |
| 3,719,813 | 3/1973 | Friedman et al. | 235/151.31 |
| 3,932,740 | 1/1976 | Mueller | 235/186 |
| 3,938,394 | 2/1976 | Morrow et al. | 73/462 |
| 3,939,715 | 2/1976 | Davis | 73/462 |

Primary Examiner—Joseph F. Ruggiero
Attorney, Agent, or Firm—W. G. Fasse; W. W. Roberts

[57] ABSTRACT

A method for determining a vector component of an oscillation such as an oscillatory signal comprises applying the measured analog oscillatory signal to the calibration voltage input of a multiplying digital-to-analog (D/A) converter, and simultaneously applying a digital reference signal to the digital input of the digital-to-analog converter. The reference signal includes sine or cosine values of an oscillation suitable for the vector component determination and having a frequency corresponding to the frequency of the oscillatory signal to be determined. The analog output of the D/A converter is then further processed to ascertain the desired vector component. The circuit arrangement for practicing this method comprises a multiplying digital-to-analog converter and a binary counter which sequentially addresses a digital memory used to provide the digital reference signals. The binary counter is controlled by a reference signal generator.

10 Claims, 2 Drawing Figures

METHOD AND CIRCUIT ARRANGEMENT FOR DETERMINING THE VECTOR COMPONENTS OF AN OSCILLATION

BACKGROUND OF THE INVENTION

The invention relates to a method for determining the vector components such as X and Y or the magnitude and phase of an oscillation represented by a measured signal accompanied by interfering signals, whereby a reference signal is used. The invention also relates to a circuit arrangement for performing the method. The interfering signals are a mixture of oscillations.

Vibrational analysis poses the problem to determine individual frequency components or vibrations from a mixture of vibrations. Mathematical methods such as the harmonic analysis for solving this problem are known. Similarly, the technological means for the realization of these methods are also known. In balancing techniques such methods are, for example, the wattmeter measuring method, the Hall multiplication method, and the controlled rectification method.

The vibrational spectrum or mixture of vibrations to be analyzed is usually an electrical, measured signal in the form of a voltage, for example. In other instances, the vibration mixture may be converted to an electrical measured signal. The mixture of vibrations generally includes in addition to the oscillation or frequency of interest, a plurality of interfering vibrations which have different amplitudes and frequencies and which must be suppressed or separated. Methods for performing such suppression or separation are known in the prior art.

According to one prior art method the measured signal is combined with a reference signal by multiplying the two signals with each other by electrical means and then integrated. In this way the X and Y components of the oscillation of interest in an orthogonal coordinate system, or the magnitude and phase position of the oscillation of interest in a polar coordinate system vibration, are obtained. The oscillation of interest may, for example, be an unbalance vibration.

Prior art methods have the disadvantage that the formation of the product of the measured signal and therefore signal is more or less subject to errors. Especially, zero point errors occur easily. Besides, the technological realization of the mentioned prior art methods is rather involved and hence quite expensive.

OBJECTS OF THE INVENTION

In view of the foregoing, it is the aim of the invention to achieve the following objects, singly or in combination:

to provide a method for determining the vector components of one oscillation from a measured signal accompanied by interfering frequencies by using a reference signal, whereby the disadvantages of the prior art are avoided;

to provide a vector component determination method which achieves a high degree of accuracy;

to provide a vector component determination method which has a negligible zero point error;

to provide a vector component determination method which may be practiced by moderately priced technological means;

to provide a circuit arrangement which performs the vector component determination according to the method of the invention in a simple and economic manner; and to provide a circuit arrangement which performs the method of the invention with greater precision or accuracy than prior art circuits.

SUMMARY OF THE INVENTION

According to the invention, there is provided a method and circuit arrangement for determining the vector components of one oscillation from a measured signal accompanied by interfering signals by using a reference signal, wherein the measured signal is applied as an analog signal to the calibration voltage input of a multiplying digital-to-analog or D/A converter. The reference signal is applied to the digital input of the D/A converter. The reference signal is generated to comprise the values of a sine or cosine reference oscillation determination of the vector components. This reference oscillation has the same frequency as the vibration which is to be determined and separated into vector components. The analog output signals of the D/A converter are then further processed to yield the desired vector components.

The method of the invention results in a simple and precise combination of the measured signal and the reference signal and has a negligible zero point error. The technological realization of the present apparatus or circuit arrangement is rather inexpensive. The precision achieved with the present method is substantially greater than when analog signal combination methods are used, since expensive analog reference signal generators and phase pick-ups are not used in the circuit arrangement according to the present invention.

The sine or cosine values for the reference oscillation may be read from a digital memory, whereby the cosine reference values may also be derived from the sine values by phase shifting. A binary counter is used according to the invention as an address counter for retrieving the reference values from said digital memory. The address counter controls the reading of the reference values from the digital memory. Thus, the memory may be scanned several times during one period of the vibration of interest.

Any desired phase position of the reference values may be established by presetting fixed addresses or counter positions. In this instance the binary address counter is set so that a starting pulse does not start the count from the zero position of the counter, but rather continues counting from a preselected counter position. This operation controls the reading of the reference values from the memory in such a manner that the values taken from the memory correspond to the respective counting position in the address counter.

The output of the D/A converter may be inverted as a function of the count in the address counter. This feature has the advantage that the inverted output of the D/A converter may be easily used to simulate the negative half wave of the reference signal. However, in an alternative embodiment the negative sine or cosine reference values may also be obtained by appropriate programming of the digital memory.

A circuit arrangement according to the invention, for performing the present method comprises a multiplying digital-to-analog converter, a digital memory, a binary counter, and a reference signal generator. The multiplying D/A converter has an analog input which is also referred to as the calibration signal input and a digital input for digital signals which are to be converted or modified. The measured signal is applied to the analog input of the D/A converter. Digital sine reference values having a specific phase position are applied to the digital input of the converter. These reference values are stored in the digital memory. The output of the reference signal generator controls the binary counter for addressing and stepping the digital memory. This circuit arrangement with its simple elements provides for an efficient signal combination of the measured signal and the reference signal. Even more important, this circuit arrangement is less expensive than previously known arrangements and operates with greater accuracy than arrangements of the prior art.

An inverter circuit may be connected to the output of the D/A converter. The inverter inverts the output signal of the D/A converter when the count of the binary counter has a predetermined value. Stated differently, the analog output voltages of the D/A converter is inverted as a function of the count in the binary counter, whereby the negative half waves of the reference signal are easily produced.

The binary counter is preferably a presettable counter which may be set to start at any desired counting position. The first reference value of a period of the reference signal may be predetermined by presetting appropriate initial values in the counter. This arrangement makes it possible to change the phase position of the reference values. Thus, the cosine values may be obtained from a memory having sine values stored therein by advancing or shifting the sine values by a $\pi/2$ phase shift. Such phase shift is easily accomplished by conventional means.

BRIEF FIGURE DESCRIPTION

In order that the invention may be clearly understood, it will now be described, by way of example, with reference to the accompanying drawings, wherein:

FIG. 1 is a block diagram of a circuit arrangement of the invention for performing the method according to the invention in connection with a balancing machine; and FIG. 2 shows, in greater detail, the part of the circuit arrangement of FIG. 1 which performs the signal combination of the measured signal and the reference signal.

DETAILED DESCRIPTION OF PREFERRED EXAMPLE EMBODIMENTS:

Figure 1:
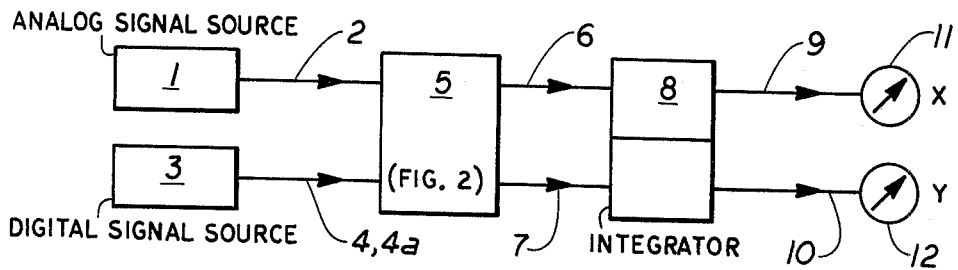

FIG. 1 shows only those portions of the circuit of a balancing machine which are essential to the invention. The example embodiment described below refers to the determination of the unbalance vibration of a revolving or rotating body. However, the invention is not limited to this field of use. The invention is useful in connection with any type of vibration. The X and Y components of the unbalance vibration are determined by the circuit arrangement of FIG. 1 in one balancing plane and in an orthogonal coordinate or reference system.

In FIG. 1, a pick-up 1 provides a measured signal. The pick-up may be of a known type, for example, an inductive pick-up, and is attached to a balancing machine, not shown. The pick-up 1 supplies the measured signal 2 which includes the unbalance vibration component of a body rotating in the balancing machine, and interfering signals having differing frequencies and amplitudes.

A reference signal generator 3 which is normally mounted to the balancing machine supplies a reference signal 4 which establishes the phase position of the vibration to be ascertained. The generator 3 supplies a further signal 4a in the form of a specific or fixed number of pulse-shaped signals referred to as counting pulses 4a which are generated during each revolution of the rotating body. The counting pulses 4 are used to obtain the reference values for the combination of the measured signal 2.

The reference signal generator 3 may, for instance, in its simplest form, be an apertured disk revolving in synchronism with the body to be balanced. Each revolution of the apertured disk generates in an appropriate known circuit a single pulse which fixes the period and phase position of the reference signal. The apertured disk also generates during each revolution a specific number of pulses which are used to produce the reference values. The reference signal generator 3 may, in the alternative, be any other pulse generator, for example, the generator 3 may be a pulse multiplier circuit which defines the phase position of the reference signal which generates pulse-shaped signals. Such generators are well known in the art.

The term "reference signal" frequently refers to two different kinds of signals. In one instance, the term relates to a reference system of an oscillation or the phase position of the oscillation relative to the reference signal. In the other instance the term refers to signals, for example sinusoidal voltages or sine values which are multiplied with the measured signal.

Figure 2:
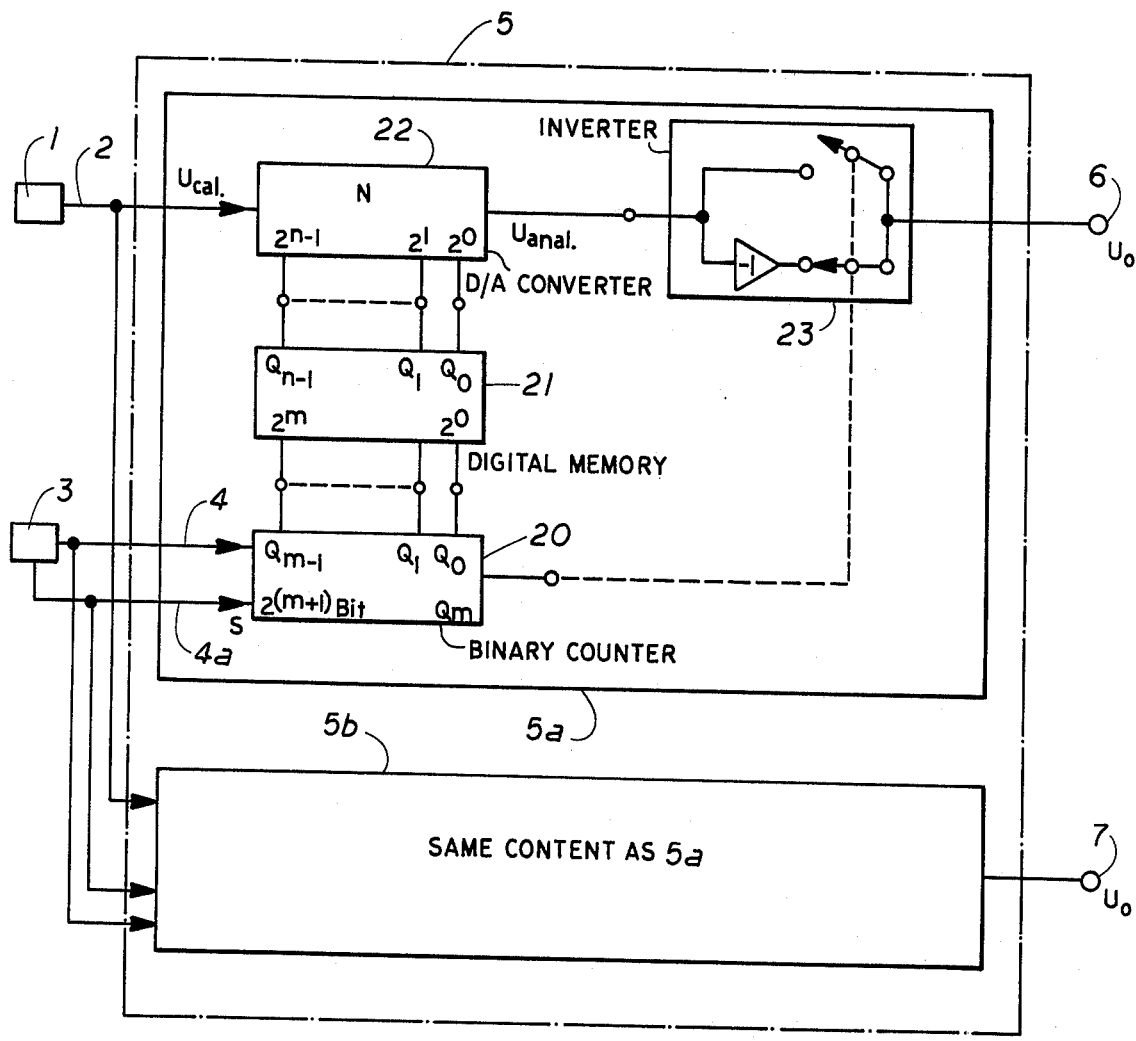

As shown in FIG. 1, the measured signal 2 and the reference signals 4 and 4a are supplied to the respective inputs of a circuit arrangement 5, details of which are shown in FIG. 2. The analog voltages 6 and 7 appear at the respective outputs of the circuit 5. The voltages 6 and 7 are integrated in an integrating device 8 in a known manner and the resulting X and Y components 9 and 10 of the unbalance vibration may be displayed, for example, by indicating instruments 11 and 12, respectively. The frequency of the unbalance vibration depends on the respective r.p.m.

Before describing the circuit arrangement 5, a brief explanation of the operating principle of a known D/A converter is in order. A D/A converter transforms a signal N present in digital form, into an analog value $v_{analog}$. This transformation may be accomplished, for example, according to the relation:

$$v_{analog} = N \cdot v_{cal.},$$

wherein: $N$ is a pure binary number which may have a capacity of $n$ bits and $v_{cal.}$ is an analog voltage which may be referred to as calibration voltage $v_{cal.}$ and which establishes the maximum value of the output voltage $v_{analog}$ of the D/A converter. The calibration voltage $v_{cal.}$ may also be referred to as a reference signal input for a D/A converter.

In a modification of the D/A converter the analog calibration voltage $v_{cal.}$ may be variable. Such D/A converters are preferentially used where symbols are generated for display on screens. These converters are also known as multiplying D/A converters because these converters actually multiply a digital signal with an analog value. Multiplying D/A converters are commercially available, for example, the type A D 7520, manufactured by "Analog Devices"* is a multiplying D/A converter which may be used for the present purposes.

*Analog Devices, Inc., Norwood, Mass.

FIG. 2 shows the circuit arrangement 5 of FIG. 1 in greater detail. The circuit arrangement 5 combines the measured signal 2 and the reference signals 4 and 4a.

This operation involves a mixed signal combination because one signal namely, the measured signal 2 is an analog signal while the other signal, namely, the reference signal, is generated or called up as a digital signal which is then processed together with the measured signal 2.

The circuit arrangement 5 comprises two practically identical circuits 5a and 5b. The circuit 5a is used to determine the X-component of the unbalance vibration. The circuit 5b is used to determine the Y-component of the unbalance vibration. The reference signal 4a of the reference signal generator 3 is applied as a start or setting pulse to the reset input S of a binary counter 20, whereby the first start pulse sets the binary counter 20 to zero. The reference signal generator 3 also provides a predetermined number of counting pulses 4, which are generated during each revolution of the body to be balanced. The counting pulses 4 are applied to the counting input of the binary counter 20 which has a capacity of $2^{m+1}$ bits.

The capacity of the counter 20 is chosen initially so that the desired subdivision or quantization of the reference signal occurs. In addition, the counter capacity may be chosen so that a digital memory 21, which is controlled by the counter 20, may be scanned several times during one period of the reference signal. Such period corresponds to one revolution of the body to be balanced.

FIG. 2 shows that the binary counter 20 is used as an address counter. The digital memory 21 has $2^m$ different address locations. The addresses of the digital memory 21 are stepped, or shifted forward, at a frequency which is of $2^{m+1}$ times the frequency of the unbalance vibration which is of interest. Thus, the digital memory 21 is scanned twice during each revolution or vibration period. The generator 3 must therefore provide twice as many counting pulses per revolution of the body to be balanced or period of the reference signal as the number ($2^m$) of available memory locations. The pulse train rate $f_a$ of the reference signal generator 3 is given by:

$$f_a = 2^{m+1} \cdot \omega/2\pi$$

where: $\omega$ = the angular frequency of the unbalance vibration.

The digital memory 21 is programmed to include successive values of the sine function, that is, the values from sine 0° to sine 180° for one half revolution or half period of the reference signal. The value of sine 0° is stored at address number 1. The value of sine ($p \cdot 180°/2^m$) is stored at the address ($p+1$) in the digital memory 21, wherein: ($p+1$) $\leq 2^m$. The number of memory locations is $2^m$. Thus, the reference signal which has the same frequency as the unbalance vibration, is generated as a digital sine function in a simple manner by selecting the number of counting pulses per revolution to correspond to the number of memory locations and due to the described programming of the digital memory.

A digital cosine function is generated in the circuit arrangement 5b in the same manner as just described for the digital sine function. The digital cosine function is the output of a second digital memory forming part of the circuit 5b and controlled by a second binary counter which receives the same start pulses 4 and counting pulses 4a as the counter 20 of the circuit arrangement 5a.

A presettable counter may also be used as the binary counter 20 whereby it is possible to start the preset counter from any desired count or counter position. Thus, the same digital memory 21, for example, may be used for both sine and cosine reference values. The preset counter has a set input which corresponds to the reset input of the binary counter 20. To call up cosine values the set input is used to set the counter to a starting or beginning position which corresponds to a phase angle of $\pi/2$. If required, any other desired phase angle may be advanced in the presettable counter by using its set input. For instance, arbitrary phase angles may be set in order to determine the unbalance components in an oblique angle coordinate system.

The operation of binary counters and digital memories is well known. Thus, no further explanations are necessary for an understanding of the circuit arrangement. The counters and memories are commercially available components, e.g. C D 4029 from RCA, Sommerville, N.J. resp. 82 S 123 from Signetics, Sunnyvale, CA.

The values stored in the digital memory 21 are scanned at the rate of the counting pulse frequency to apply these values to the digital input of a D/A converter 22. A second D/A converter, not shown, is also part of the circuit arrangement 5b. The measured signal 2 is applied to the analog calibration voltage input $U_{cal}$ of the converter 22. In the D/A converter 22, a multiplicative signal combination takes place between the measured signal 2 and the digital reference signal 4a, as explained above. The digital signal 4a is now in the form of digital sine or cosine values. After the multiplication operation, the output $U_{analog}$ of the converter 22 is an analog voltage which represents the product of the measured signal 2 and the sine or cosine reference values, respectively.

The digital reference signal always applies only positive values to the digital input of the D/A converter 22 because a digital number is always an absolute value. The negative half wave of the reference signal is produced by inverting the analog output voltage $U_{analog}$ of the converter 22 at specific times. In the circuit arrangement 5a the sine values of the output $U_{analog}$ are inverted for the range of 180° to 360°. In the circuit arrangement 5b, the cosine values of the analog output voltage is inverted for the range of 90° to 270°. The just mentioned inverting takes place in FIG. 2 by an inverter circuit 23 which switches over. When the most significant bit $Q_m$ of the address counter 20 becomes 1, the inverting amplifier 26 (having a gain $-1$) is connected to the output circuit of the D/A converter 22. In the circuit arrangement 5b the switching or rather, inverting, takes place in a similar manner when a binary counter indicates a cosine value of zero. As mentioned above, the output voltages $U_0$ out of the inverter outputs 6, 7 are integrated in the respective integrators 8. At the outputs 9, 10 of these integrators appear the respective X and Y component voltages for further processing and/or display. The output voltages 9 and 10 of the integrating device 8 may also be used in a known manner to display the unbalance vibration in terms of magnitude and angular position in a polar coordinate display device. The voltages 9 and 10 may also be used to control a balancing operation.

Although the invention has been described with reference to specific example embodiments, it is to be understood, that it is intended to cover all modifications and equivalents within the scope of the appended claims.

What is claimed is:

1. A circuit arrangement for extracting required analog output signals from an analog oscillatory input signal to determine the vector components of said input signal which includes a mixture of interfering signals having different frequencies and amplitudes, comprising a first source for supplying said analog input signals, and a second source for supplying digital reference signal, a multiplying digital-to-analog converter having a plurality of digital input means and analog input means, as well as output means, said first source of analog input signals being connected to said analog input means of said D/A converter, said circuit arrangement further comprising digital memory means having addressing inputs and control outputs and binary counter means having input means connected to said second source for supplying said digital reference signals to said binary counter means, said binary counter means having output means connected to said addressing inputs of said digital memory means, said control outputs of said digital memory means being connected to said digital input means of said D/A converter, whereby a multiplying signal combination is provided in said D/A converter in response to the addressing and stepping of said digital memory by said binary counter in response to said digital reference signals.

2. The circuit arrangement of claim 1, further comprising inverter circuit means connected to said D/A converter output means, said binary counter means having further output means connected to said inverter circuit means for switching the inverter circuit means to invert the output signal of said D/A converter in response to a predetermined count in said binary counter means.

3. The circuit arrangement of claim 1, wherein said binary counter means comprises a presettable counter which may be preset to any desired start counting position out of a plurality of such positions.

4. A method for extracting required analog output signals from an oscillatory analog input signal to determine the vector components of said input signal which includes a mixture of interfering signals having different frequencies and amplitudes comprising applying said oscillatory input signal to the analog input of a multiplying digital-to-analog converter, producing a digital reference signal corresponding to sine or cosine values of a reference oscillation suitable for said determining of vector components, said digital reference signal having a frequency corresponding to the frequency of said oscillatory, analog input signal, and applying said digital reference signal to the digital input means of said digital-to-analog converter, and then using the analog output signal of said digital-to-analog converter for further processing to determine said vector components.

5. The method of claim 4, further comprising sequentially addressing a memory to produce said sine or cosine reference values of said digital reference signal.

6. The method of claim 5, further comprising deriving the digital cosine reference values from the digital sine reference values by applying a phase shift to the sine reference values.

7. The method of claim 5, wherein said digital reference values are retrieved from said memory by using a binary count for said sequential addressing to control the operation of said D/A-converter through said memory.

8. The method of claim 7, wherein said binary count steps the digital memory in such a manner that the addresses of the digital memory are scanned several times during one period of the oscillation, the vector components of which are to be ascertained.

9. The method of claim 7, further comprising producing any desired phase position for the reference values by preselecting fixed addresses or counting positions in the binary counter.

10. The method of claim 7, further comprising inverting the output signal of the digital-to-analog converter in response to a predetermined counting position of the addressing binary counter.

* * * * *